(No Model.)  2 Sheets—Sheet 1.
R. S. CARR.
PLANTER.
No. 279,221.  Patented June 12, 1883.
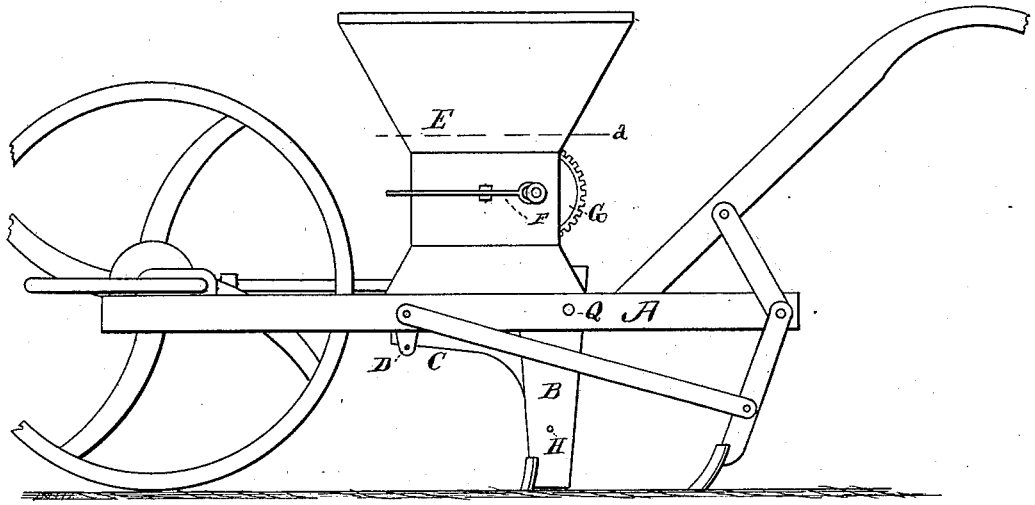
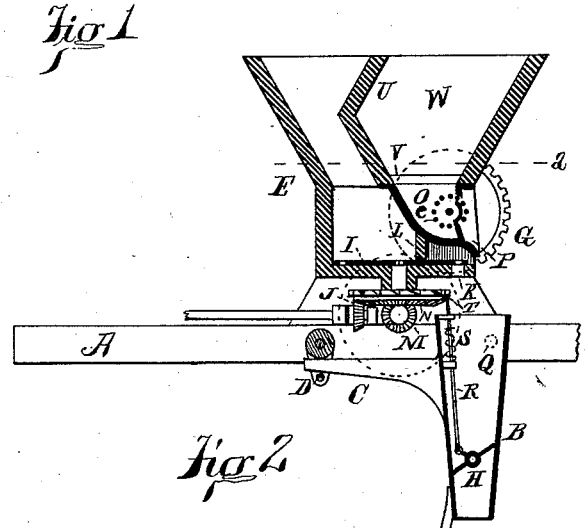
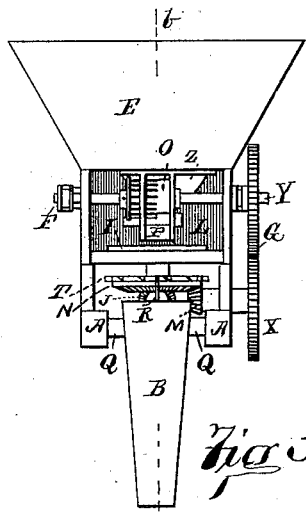
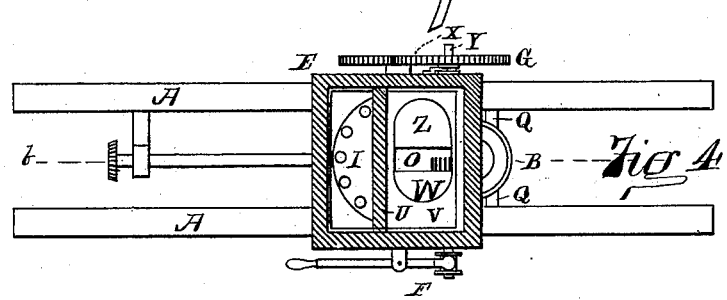
WITNESSES:  
John R. Woods  
W. F. Abrams  
INVENTOR  
Robert S. Carr  
by James W. See  
ATTORNEY (No Model.) 2 Sheets—Sheet 2.

R. S. CARR.
PLANTER.

No. 279,221. Patented June 12, 1883.

WITNESSES:   Robert S. Carr INVENTOR
   by James W. See
   ATTORNEY

United States Patent Office.

ROBERT S. CARR, OF HAMILTON, OHIO, ASSIGNOR, BY MESNE ASSIGNMENTS, TO THE SOHN RIDGE IMPLEMENT COMPANY, OF SAME PLACE.

PLANTER.

SPECIFICATION forming part of Letters Patent No. 279,221, dated June 12, 1883.

Application filed November 18, 1882. (No model.)

*To all whom it may concern:*

Be it known that I, ROBERT S. CARR, of Hamilton, Butler county, Ohio, have invented certain new and useful Improvements in Planters, of which the following is a specification.

This invention relates to a planter for delivering a grain of seed and a quantity of fertilizer at certain intervals along the seed-row.

The object of the invention is to insure that the fertilizer will drop with the grain of seed and not spill between seeding-points.

The invention consists of a novel construction of combined seed-planter and fertilizer-dropper, and of improved devices for feeding fertilizer, as hereinafter set forth.

Figure 5:
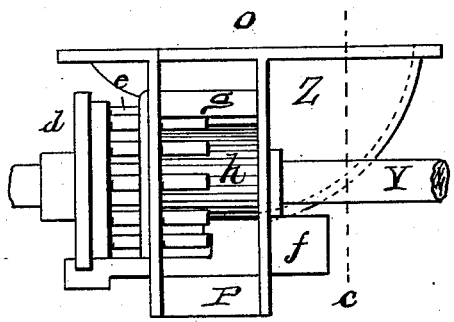
Figure 6:
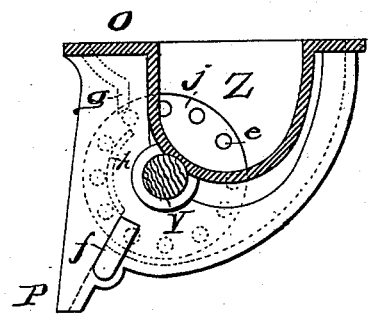

In the accompanying drawings, Figure 1 is a side view of a planter embodying my improvements. Fig. 2 is a vertical section of part of the same on line $b$; Fig. 3, a rear elevation; Fig. 4, a sectional plan on line $a$; Fig. 5, a rear view of the fertilizer-feeder; and Fig. 6, a side view, part section, of the same.

The main part of the planter is of the ordinary type, arranged by means of a ground-wheel and a rotary seed-plate to drop a grain of seed at certain intervals along the seed-row, following shovels doing the covering. Such planters are well known, and I therefore avoid herein a detailed description of them.

A is the frame of such a planter as has been referred to; B, the seed-spout which delivers the seed to the furrow formed by a tooth at its bottom; C, an arm projecting forward from the spout; D, a break-pin holding the spout in normal position in the usual manner with such devices; E, a seed-box mounted on the frame; I, the usual seed-plate; L, the usual partition under which the plate carries the grain; N, the usual bevel-gear which actuates the seed-plate; J, the usual pinion which operates the bevel-gear; K, the usual opening under the seed-plate, through which the grain of seed falls; Q Q, the trunnions on which the seed-spout pivots when the break-pin gives away.

As is usual with this class of planters, the distance between seed-droppings is regulated by altering the relative rate of rotation of ground-wheel and seed-plate, and the dropping of a single seed grain is secured by using a seed-plate having properly-sized seed-cavities.

U is a partition in the seed-box; V, a bottom for that portion of the seed-box divided off by the partition; W, the fertilizer-box formed by such division; O, a rotary feed-cup below the fertilizer-box and receiving fertilizer from it; $d$, Fig. 5, the fertilizer feed-wheel; $e$, the feeding-pins of this feed-wheel; Y, the shaft of this feed-wheel; G, a spur-gear on this shaft; F, a lever for reciprocating shaft Y and adjusting the fertilizer feed-wheel; M, a bevel-pinion driven by bevel-gear N, and having its shaft extending out from under the seed-box; X, a spur-gear on the shaft of pinion M, meshing into spur-gear G; P, the discharge-point of fertilizer-feeder, situated, as is opening K, over the top of spout B; H, a valve near bottom of seed-spout; R, a rod attached to valve H and projecting up through spout, and guided in bearings cast inside of spout; S, a spring on rod R to maintain valve normally shut; T, a series of beveled knockers arranged on periphery of bevel-gear N in position to engage the upper end of rod R and depress it as each knocker passes; $f$, the gate to narrow the discharge-wicket of the fertilizer-cup as the feed-pins are adjusted outward from the cup; $g$, the curtain to close the front of the upper part of the fertilizer-cup; $h$, a segmental gate arranged between the walls of the fertilizer-cup within the circle of pins $e$ and between the curtain and gate; $j$, the rosette through which the pins $e$ reach into the cup, and Z an extended side mouth to the feed-cup, discharging into the interior of the feed-wheel pins.

The fertilizer feed-cup itself forms the subject of an application filed by me August 14, 1882, and I disclaim it in this application in favor of said former application. The side mouth Z is, however, a part of the present invention. Fertilizer is ugly stuff to operate upon with a force-feed of this or any other kind, and the mouth Z, discharging directly into the inside of the circle of feed-pins, is found to obviate many of the difficulties heretofore encountered in feeding fertilizer.

In the operation of my planter a grain of corn is dropped into the spout by the seed-plate while a continuous stream of fertilizer flows into the spout from the feed-cup. Before the next grain is received the valve is knocked open by the beveled knockers, the grain of seed surrounded by fertilizer falls into the furrow, and the valve springs shut again. The valve being close to the ground, the two matters have but a short distance to fall, and will consequently reach the furrow at the same time, regardless of the difference in weight of the two dissimilar matters.

The rate of fertilizer-feed is altered independent of the grain device from which it receives its motion, and when the driving-gear of the seed-plate is thrown out of action in the usual manner the fertilizer-feed also stops. The pins of the fertilizer feed-wheel are easily cleaned while the machine is in motion by operating lever F, which reciprocates the pins through the rosette. When the break-pin gives way the seed-spout falls back, as usual, not being prevented by the valve-operating connections, and when the spout is restored to place the valve-operating mechanism is found ready for action.

It is essential to my device that the fertilizer should flow incessantly, and I disclaim the combination of an intermittent fertilizer-feed with an intermittent grain-feed.

I claim as my invention—

1. In a planter, the combination, substantially as set forth, of an intermittent seed-dropping device, an incessant fertilizer-feeding device, a receiving and retaining spout arranged to receive the discharge from both said devices, a valve in said spout to retain the mixed seed and fertilizer, and a means for opening and closing said valve during the intermission in the flow of seed to the spout.

2. In a planter, the combination, substantially as set forth, of a pivoted seed-spout, a break-pin, a valve in the spout, and a valve-operating connection attached to the spout and having a free upper terminal.

3. In a planter, a rotary seed-plate, a bevel-gear thereto, a bevel-pinion driven thereby, a fertilizer-feeder, and a pair of spur-gears connecting said pinion with the fertilizer-feeder, combined substantially as set forth.

4. In a planter, the seed-box E, seed-plate I in the bottom thereof, partitions U V in said box, and fertilizer-feeder O, arranged in the space formed by said partitions and a wall of said box, all combined substantially as and for the purpose specified.

ROBERT S. CARR.

Witnesses:
J. W. SEE,
ISRAEL WILLIAMS.